March 17, 1964 K. G. KREUTER 3,125,109
CONSTANT VOLUME CONTROL
Filed May 9, 1962
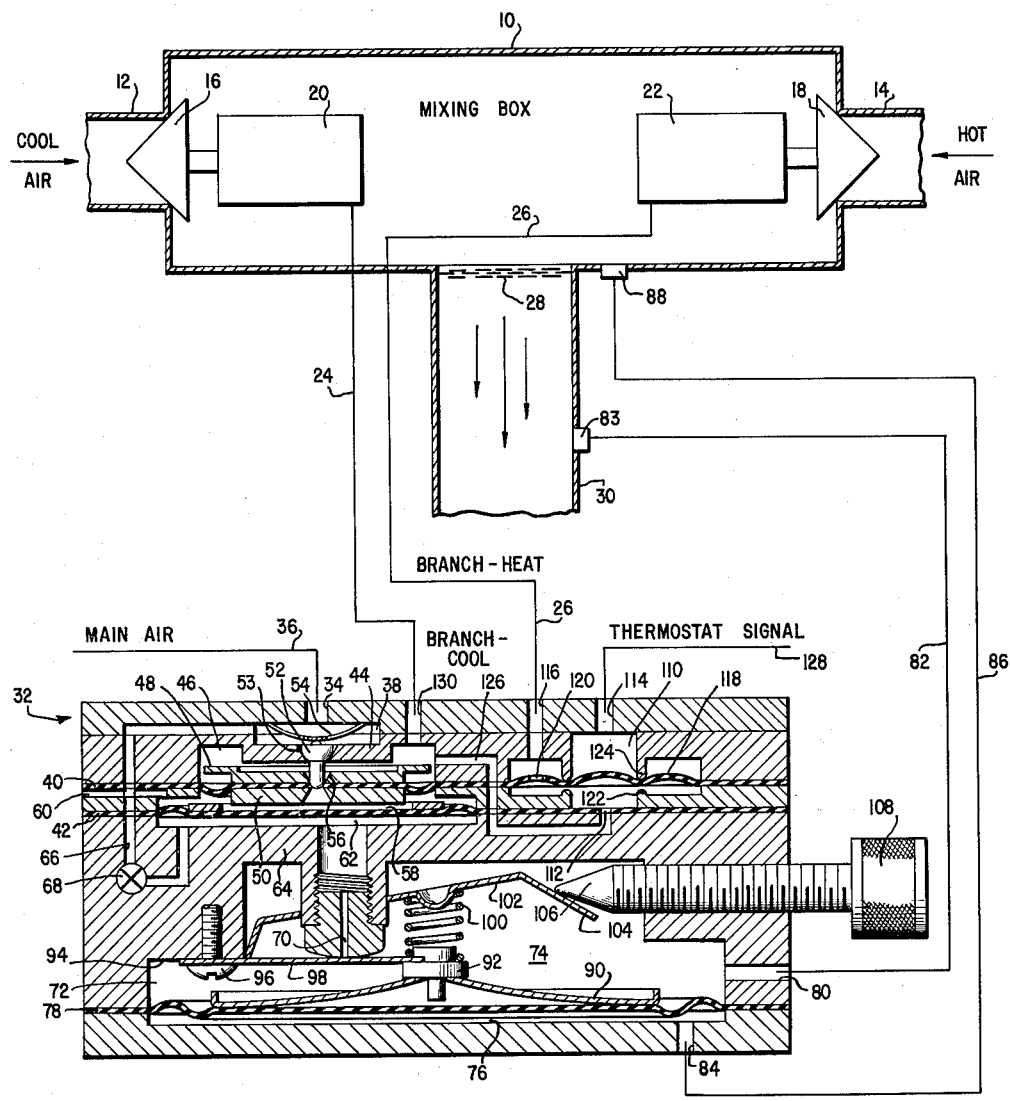
INVENTOR.
KENNETH G. KREUTER
ATTORNEYS.

United States Patent Office 3,125,109
Patented Mar. 17, 1964

3,125,109
CONSTANT VOLUME CONTROL
Kenneth G. Kreuter, Goshen, Ind., assignor to Robertshaw Controls Company, a corporation of Delaware
Filed May 9, 1962, Ser. No. 193,522
5 Claims. (Cl. 137—82)

This invention relates to air conditioning systems and more particularly to a control apparatus for automatically regulating the temperature and volume of air delivered to a room or space in which the air is being conditioned.

The invention is particularly adapted for employment in the well-known type of air conditioning systems in which two separate streams of air at different temperatures are blended in a mixing chamber with the blended air delivered from the mixing chamber into a room or rooms of a building. One of the streams is maintained at a temperature above the temperature desired to be maintained in the room, and the other stream is maintained at a temperature below the temperature desired in the room. By varying the proportions of hot and cold air admitted through the mixing chamber, a blended stream of conditioned air may be delivered to the room to maintain the proper conditions.

One of the objects of this invention is to provide an improved pneumatic control for regulating the temperature in a mixing chamber and maintaining a substantially constant volume of air delivered from the mixing chamber.

Another object is to provide an improved pneumatic control device for controlling the temperature of air delivered to a room by varying the proportions of hot and cold air in a mixing chamber and maintaining a constant volume of flow of the blended air which is delivered from the mixing chamber.

Still another object is to provide a compact pneumatic control device having two outlets, one of which transmits a first output pressure in response to variations in the rate of flow through an air conditioning duct, the other of which transmits the higher of either the first output signal or a pneumatic thermostat signal.

In achievement of the foregoing and other objects, a mixing box is provided having a cold air inlet and a warm air inlet with a delivery duct for distributing blended air to a room being conditioned. Each of the inlets are controlled by a pneumatically operated valve for varying the amounts of cold and hot air admitted to the mixing box. For regulating the volume rate of flow and temperature of the delivered air, the cold air valve is controlled by a static pressure regulator in response to variations in the rate of flow through the delivery duct, and the hot air valve is controlled by a pneumatic thermostat signal which varies directly with the temperature of the room being conditioned. However, when the thermostat signal is low due to a drop in room temperature, and the flow rate is excessive due to the demand for hot air, control of the hot air valve is automatically transferred to the pressure regulator.

Flow regulation is accomplished by a differential pressure responsive diaphragm exposed on opposite sides to the static pressures in the mixing chamber and a downstream location in the delivery duct. Connected to the diaphragm is a flapper valve which varies the rate of bleed through the leak port of a control chamber in response to movement of the diaphragm. When the leak port is closed pressure builds up in the control chamber to actuate a supply and exhaust valve and connect a branch or output chamber with a source of constant pressure. The operator for the cold air valve is connected with an outlet which communicates directly with the branch chamber, and the operator for the hot air valve is connected with an outlet which communicates with a transfer chamber.

Mounted in the transfer chamber is a resilient selector valve, one side of which is connected to the branch chamber, and the other side of which is connected with the pneumatic thermostat signal. Slits in the diaphragm open to connect the outlet of the transfer chamber with the branch chamber when the branch pressure exceeds the thermostat signal. When the thermostat signal exceeds the branch pressure, the outlet of the transfer chamber is connected with the thermostat signal. Accordingly, the hot air valve is under the control of either the branch chamber pressure or the thermostat signal, whichever is higher.

When the thermostat calls for heat, the hot air valve moves to admit more hot air to the mixing chamber and the increased flow causes the flapper valve to close the leak port. The subsequent build up of pressure in the control chamber causes admission of pressure to the branch chamber and closes the cold air valve. If the branch pressure is greater than the thermostat signal the hot air valve is connected with the branch chamber and is moved toward the inlet to reduce the flow until the rate of flow through the delivery duct is returned to its normal value. As the temperature increases, the thermostat signal increases accordingly until it exceeds the branch pressure and acts through the selector valve to again take over control of the hot air valve.

Other objects and advantages will become apparent from the following description taken in connection with the accompanying drawing which schematically illustrates a mixing box having a pneumatic control embodying the invention.

With reference to the drawing, a mixing box is illustrated at 10 having a cold air inlet 12 and a hot air inlet 14. Flow of cold and hot air streams into the mixing box is controlled, respectively, by valves 16 and 18. Valves 16 and 18 are operated by conventional pneumatic piston actuators 20 and 22, respectively. When pressure is supplied through a conduit 24 to actuator 20, and through a conduit 26 to actuator 22, valves 16 and 18, respectively, move toward the inlets to decrease the flows into the mixing box. When the pressure in conduits 24 and 26 is released, valves 16 and 18 move away from the inlets to increase the flow into the mixing box through their respective inlets.

Blended air from mixing box 10 passes through a conventional grill or screen 28 into a delivery duct 30 which conducts the blended stream to a room in which the air is being conditioned. Temperature of the air delivered to the room is controlled by varying the proportions of cool and hot air admitted to the mixing box through inlets 12 and 14, and the volume rate of flow of air delivered is determined by the total flow admitted to the mixing box from both the cold and hot air inlet.

Valve operators 20 and 22 are controlled by a pneumatic control device comprising a housing 32 which is illustrated in section in the drawing. Housing 32 is provided with a supply port 34 which is connected with a main air conduit 36 from a source of compressed air (not shown). Conduit 36 supplies air at a constant pressure of 15 to 20 p.s.i.g. to supply port 34. Supply port 34 communicates with a supply chamber 38 formed in the housing.

Flexible diaphragms 40 and 42 are mounted in housing 32 with their peripheries clamped between cooperating sections of the housing. Diaphragm 40 cooperates with a wall 44 to form a branch chamber 46. Wall 44 also forms one wall of supply chamber 38. Diaphragm 40 has its central portion clamped between a pair of plates 48 and 50 which move with diaphragm 40 when the pressure in chamber 46 varies to expand and contract the chamber.

For controlling communication between supply chamber 38 and branch chamber 46, a valve element 52 is movably mounted in a port 53 in wall 44, and is biased to a closed position by a bowed spring washer 54 mounted in supply chamber 38. Valve 52 is formed with an exhaust valve stem which extends into branch chamber 46 and cooperates with a ported valve seat 56 formed centrally in plates 48, 50 and diaphragm 40 to control communication between branch chamber 46 and an exhaust chamber 58 which is formed between diaphragms 40 and 42. Chamber 58 communicates with ambient atmosphere through a port 60 formed in the wall of the housing.

Diaphragm 42 forms a movable wall for a control chamber 62, the other wall of which is formed by a rigid partition 64 in the housing. Control chamber 62 communicates with supply chamber 38 through a passage 66 having a restriction 68. Pressure is bled from control chamber 62 through a leak port 70 into a cavity 72. Accordingly, the pressure in control chamber 62 varies in accordance with the rate of bleed through the leak port.

Cavity 72 is divided into a pair of chambers 74 and 76 by a differential pressure responsive diaphragm 78 which is clamped at its periphery between cooperating sections of housing 32. Chamber 74 is provided with an inlet port 80 connected with a static pressure conduit 82 in communication with delivery duct 30 at opening 83 downstream of mixing box 10. Chamber 76 has an inlet 84 connected with static pressure conduit 86 having its upper end connected with mixing box 10 at an opening 88. The pressure drop across diaphragm 78 is indicative of the pressure drop across the outlet of the mixing box, and variations in the pressure differential between chambers 74 and 76 tends to cause reciprocation of diaphragm 78 in cavity 72.

Seated against diaphragm 78 in chamber 74 is a diaphragm plate 90 which is centrally apertured to receive the stem of a spring seat member 92. Mounted on a shoulder 94 by screw 96 is a resilient flapper valve 98 having its free end secured to member 92 by a spring 100. Spring 100 has its other end seated on a resilient lever 102 which extends from shoulder 94. Lever 102 has a downwardly inclined free end portion 104 which is engaged by the tapered end 106 of a set point screw 108. Set point screw 108 is threadedly mounted in the wall of the housing. Adjustment of set point screw 108 acts through lever 102 to move spring 100, flapper 98, plate 90 and diaphragm 78 toward or away from leak port 70. Set point screw 108 thus determines the pressure differential between chambers 74 and 76 (and hence, the pressure drop across the outlet of mixing box 10) required to close the leak port.

Formed in housing 32 is a transfer chamber 110 having two inlets 112 and 114, and a single outlet 116. Inlets 112 and 114 are separated by a resilient diaphragm selector valve 118. Diaphragm 118 is provided with a ring of slits or apertures 120 spaced inwardly of its periphery. Inlets 112 and 114 are concentric with opposed annular bosses 122 and 124, respectively, which project inwardly of chamber 110. When the pressure at inlet 112 is greater than that at inlet 114, diaphragm valve 118 is in the position illustrated in the drawing and pressure flows from inlet 112 through slits 120 (which are stretched open by distention of the diaphragm) to outlet 116. Conversely, when the pressure at inlet 114 is greater than that at inlet 112, diaphragm 118 is forced against boss 122 shutting off inlet 112 from outlet 116, and outlet 116 is connected with inlet 114. Therefore, outlet 116 is always connected with the higher of the pressures introduced at inlets 112 and 114.

Inlet 112 is connected through a passage 126 with branch chamber 46. Inlet 114 is connected with a thermostat conduit 128 from a conventional pneumatic thermostat (not shown) located in the room or space being air conditioned. Conduit 128 transmitts a variable pneumatic signal into chamber 110 in accordance with variations in temperature at the room thermostat. The thermostat is preferably of the type which transmits a pneumatic signal that increases with temperature. Conduit 24 is connected with branch chamber 46 at an outlet port 130.

Piston actuator 20 for cold air valve 16 is therefore under the control of port 130 of branch chamber 46 and piston actuator 22 for hot air valve 18 is under the control of port 116 of the transfer chamber.

In operation, set point screw 108 is adjusted so that when the rate of flow through delivery duct 30 is at its desired value, a flapper 98 is positioned away from leak port 70 and the pressure in control chamber 62 is exhausted through leak port 70. With the low pressure in leak port 70, valve 52 is closed and branch chamber 46 is exhausted through ports 56 and 60 to the ambient atmosphere. When the room thermostat calls for heat, the pressure in thermostat conduit 128 decreases and hot air valve 18 opens to increase the quantity of hot air admitted to the mixing box. Consequently, the rate of flow through delivery duct 30 increases causing an increase in the pressure differential in conduit 82 between chambers 74 and 76. As a result, diaphragm 78 moves flapper 98 against leak port 70. As the pressure increases in control chamber 62 due to the closing of leak port 70, diaphragm 42 moves against plate 50 and closes port 56 against the exhaust stem of valve 52. When the pressure in control chamber 60 is sufficient to unseat valve 52 from valve seat 53, supply pressure flows into branch chamber 46 and through port 130 and conduit 24 to close cold air valve 16 shutting off the flow of cold air into the mixing box. In the event that the pressure drop across the mixing box outlet is too great even with the cold air valve closed, the branch pressure will continue to increase until the pressure at inlet 112 of transfer chamber 110 is greater than the thermostat pressure. Selector valve 118 will then connect outlet port 116 with branch chamber 46 to transfer control of the hot air valve from the thermostat to the branch chamber. Accordingly, hot air valve 18 will move to reduce the flow of hot air into the mixing box until the delivery rate attains the value determined by the set point screw 108. As the thermostat becomes satisfied, the thermostat signal in conduit 128 will increase until it overcomes the branch pressure from inlet 112, and selector valve 118 will again transfer control of the hot air valve from the branch pressure to the thermostat signal and the hot air valve will be closed when the thermostat is satisfied.

As the hot air valve closes, the pressure drop decreases thereby opening the leak port. As the pressure decreases in control chamber 62, diaphragm 42 and 40 move away from wall 44 permitting valve 52 to seat against port 53 and plate 48 moves away from the exhaust stem of valve 52 to exhaust the branch chamber. With decreasing branch pressure, cold air valve 16 gradually opens to compensate for closing of the hot air valve 18 to return the system to a balanced condition.

For clarity of illustration, control device 32 is illustrated positioned externally of mixing box 10. However, it should be understood that it is contemplated that control device 32 may be mounted as a single unit with actuators 20 and 22, and valves 16 and 18 within mixing box 10. In this situation conduits 36, 82 and 86 will be appropriately connected through openings in mixing box 10.

While the invention has been schematically illustrated in a specific form for purposes of description, it should be understood that various alterations in construction and arrangement of parts is possible without departing from the scope of the invention which is defined in the appended claims.

What is claimed is:
1. A pneumatic control device comprising,
a supply port for connection with a source of compressed air,
a control chamber having a leak port connected with the supply port,
a branch chamber separated from the control chamber by a pressure responsive movable wall,
valve means between the branch chamber and supply port for controlling supply and exhaust of air to the branch chamber in response to increases and decreases, respectively, in the control chamber pressure,
a flapper valve movable relative to the leak port to vary the pressure in the control chamber,
a diaphragm for actuating the flapper valve in response to pressure differentials acting on the diaphragm,
a transfer chamber having two inlets and a single outlet,
one of the inlets being connected with the branch chamber and the other adapted for connection with a variable signal pressure,
and a selector valve in the transfer chamber operative to connect the outlet with the inlet subject to the higher pressure.

2. A pneumatic control device comprising,
a supply port for connection with a source of fluid pressure,
a control chamber having a leak port communicating with the supply port,
a branch chamber separated from the control chamber by a pressure responsive movable wall,
valve means between the supply port and branch chamber for controlling supply and exhaust of air to the branch chamber in response to increases and decreases, respectively, in the control chamber pressure,
a flapper valve movable relative to the leak port for varying the pressure in the control chamber,
differential pressure responsive means for actuating the flapper valve,
a transfer chamber having two inlets and a single outlet,
a selector valve mounted in the transfer chamber operable to connect the outlet with the inlet having the higher pressure,
and a passage connecting the branch chamber with one of said inlets.

3. A pneumatic control device comprising,
a housing having a supply port for connection with a source of compressed air,
a cavity in the housing,
a control chamber between the cavity and the supply port,
a passage connecting the control chamber with the supply port,
a leak port connecting the control chamber with the cavity,
a branch chamber separated from the control chamber by a pressure responsive movable wall,
valve means between the supply port and branch chamber movable in response to variations in the control chamber pressure to control supply and exhaust of air to the branch chamber,
a differential pressure responsive diaphragm mounted in the cavity movable in response to pressure differentials acting on the diaphragm,
a resilient lever mounted in the cavity having an inclined free end,
a spring seated between the lever and the diaphragm,
a set point screw mounted in the housing engaging the inclined free end of the lever to adjustably position the diaphragm in the cavity,
a flapper valve connected with the diaphragm movable relative to the leak port to vary the pressure in the control chamber in response to movement of the diaphragm,
a transfer chamber having two inlets and a single outlet,
selector valve means in the transfer chamber operable to connect the outlet with the inlet having the higher pressure,
and a passage connecting the branch chamber with one of the inlets.

4. A pneumatic control device comprising,
a supply port connected with a source of compressed air,
a control chamber and a branch chamber separated by a pressure responsive movable wall,
valve means between the branch chamber and supply port responsive to movement of the movable wall to connect the branch chamber with the supply port upon increases in the control chamber pressure and to connect the branch chamber with ambient atmosphere upon decreases in the control chamber pressure,
a cavity on the opposite side of the control chamber from the branch chamber,
a leak port connecting the control chamber with the cavity,
a restricted passage connecting the control chamber with the supply port,
a diaphragm mounted in the cavity movable in response to pressure differentials acting on the diaphragm,
means connecting opposite sides of the diaphragm with variable pressures,
a resilient lever mounted in the cavity having an inclined free end,
a flapper valve mounted in the cavity for movement relative to the leak port to control the pressure in the control chamber,
a spring mounted on the lever biasing the flapper into engagement with the diaphragm,
a transfer chamber having a first inlet and an outlet in one wall and a second inlet in the other wall,
means connecting the first inlet with a variable pressure,
means connecting the second inlet with the branch chamber,
and a selector valve in the transfer chamber operable to connect the outlet of the transfer chamber with the inlet having the higher pressure.

5. A pneumatic control device as defined in claim 4 including,
a set point screw threadedly mounted in the cavity in engagement with the inclined free end of the lever for adjusting the position of the diaphragm and flapper valve relative to the leak port.

References Cited in the file of this patent
UNITED STATES PATENTS

| | | |
|---|---|---|
| 2,803,258 | Dyson | Aug. 20, 1957 |
| 2,817,213 | Miner | Dec. 24, 1957 |
| 2,858,840 | Wright | Nov. 4, 1958 |
| 2,979,265 | Stock | Apr. 11, 1961 |
| 3,002,692 | Williams | Oct. 3, 1961 |
| 3,030,024 | Joesting | Apr. 17, 1962 |